DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 10, 1970

872 O.G. 357

T872,003

LIGHT-SENSITIVE POLYMERS

Douglas G. Borden, Jack L. R. Williams, and Thomas M. Laakso, all % Kodak Park, Rochester, N.Y. 14650

Filed Sept. 30, 1969, Ser. No. 862,503
**Int. Cl. G03c *1/68***
U.S. Cl. 96—115
No Drawing. 16 Pages Specification

Light-sensitive polymers containing a plurality of quaternized and/or quaternizable nitrogen atoms in the polymer backbone are disclosed. The polymers are of two types. Type 1 polymers are formed by the quaternization with a difunctional quaternizing agent, such as a xylene dibromide, of a bis-tertiary amine containing chromophoric groups and which have conjugation extending throughout the molecule from one nitrogen atom to the other. Examples of bis-tertiary amines which may be used include those having the formulae

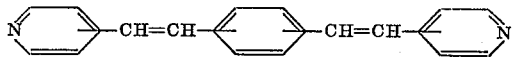

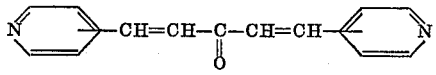

and

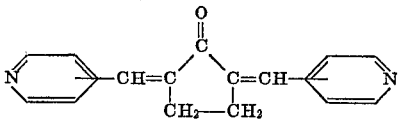

Polymers of Type 2 are obtained by esterifying a polymer containing quaternizable nitrogen atoms and reactive hydroxyl groups with an acidic light-sensitive compound. The nitrogen atoms contained in the polymer backbone may or may not be quaternized. Examples of such polymers are those containing recurring units having the following structures:

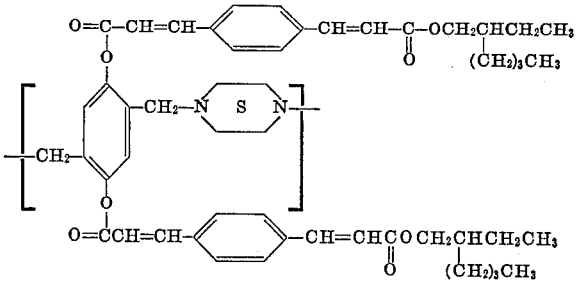

and

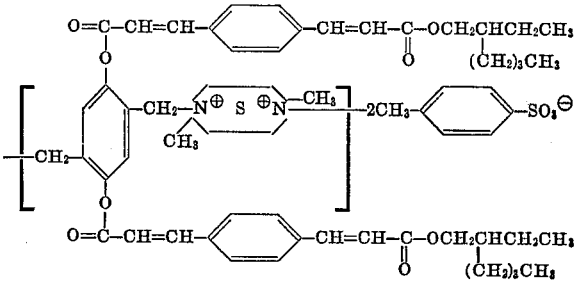

The polymers of both Type 1 and Type 2 are useful in photomechanical reproduction processes. Their use in the preparation of lithographic plates is disclosed.